(12) United States Patent
Cudak et al.

(10) Patent No.: US 12,197,551 B2
(45) Date of Patent: Jan. 14, 2025

(54) DEVICE AND METHOD FOR ACCESSING ELECTRONIC DEVICE

(71) Applicant: LENOVO (SINGAPORE) PTE. LTD, New Tech Park (SG)

(72) Inventors: Gary D. Cudak, Wake Forest, NC (US); Nathan Peterson, Oxford, NC (US); John M. Petersen, Wake Forest, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 295 days.

(21) Appl. No.: 17/656,780

(22) Filed: Mar. 28, 2022

(65) Prior Publication Data

US 2023/0325480 A1    Oct. 12, 2023

(51) Int. Cl.
*G06F 21/32*    (2013.01)

(52) U.S. Cl.
CPC .................... *G06F 21/32* (2013.01)

(58) Field of Classification Search
CPC ....... G06F 21/32; G06F 21/31; H04L 63/0861
See application file for complete search history.

(56) References Cited

U.S. PATENT DOCUMENTS

| | | | |
|---|---|---|---|
| 9,305,153 B1 * | 4/2016 | Ackerman | G06F 21/32 |
| 9,762,581 B1 * | 9/2017 | Wang | H04L 63/102 |
| 2016/0210407 A1 * | 7/2016 | Hwang | G16B 50/30 |
| 2020/0167783 A1 * | 5/2020 | Bermudez | G06Q 20/4016 |
| 2020/0337653 A1 * | 10/2020 | Alcaide | A61B 5/369 |

FOREIGN PATENT DOCUMENTS

| | | | | |
|---|---|---|---|---|
| GB | 2595931 A | * | 12/2021 | G06F 21/32 |
| KR | 20170011482 A | * | 2/2017 | G06F 21/32 |

* cited by examiner

*Primary Examiner* — Abiy Getachew
*Assistant Examiner* — Calvin Thanh Nguyen
(74) *Attorney, Agent, or Firm* — Dean D. Small; The Small Patent Law Group, LLC

(57) ABSTRACT

An electronic device is provided that has an input device including an input sensor configured to detect synaptic signals from a user. An electronic device sensor is also provided that detects environmental signals or user signals. The electronic device also includes a memory to store executable instructions, and one or more processors. When implementing the executable instructions, the one or more processors determine an environmental characteristic based on the environmental signals or a user characteristic based on the user signals, and determine when to grant access to the electronic device based on the synaptic signals based on the environmental characteristic or the user characteristic.

20 Claims, 4 Drawing Sheets

DEVICE AND METHOD FOR ACCESSING ELECTRONIC DEVICE

BACKGROUND

Embodiments herein generally relate to devices and methods for accessing an electronic device.

Electronic devices, such as laptop computers, mobile phones, personal digital assistants (PDAs), iPads, other computing devices, etc. have become part of many individuals' everyday life. Such electronic devices continue to be improved to make the experience of user as enjoyable as possible.

With the increase of popularity of electronic devices, security related to accessing these devices continues to be a concern. Often an electronic device includes a username and password that must be entered before the electronic device can be accessed. However, bad actors can often determine a login, username, password, or the like and gain access to information, files, etc. accessible to the electronic device. Such information may include social security numbers, bank account information, personal email, or messaging information, other personal or confidential information, or the like. In addition, with numerous electronic devices, personal accounts, electronic mail accounts, work accounts, etc. often such login and password information can be forgotten, misplaced, mis-typed, etc. resulting in annoyance and frustration for the user of the electronic device.

Some electronic devices utilize biometric data in lieu of a username and password. The biometric data can include fingerprints, facial recognition, voice recognition, thought response recognition, or the like that is used to identify the user of an individual electronic device. Because the biometric information is unique to the user, additional security may be provided without the need of remembering or inputting information into the electronic device. Still, when biometric information is utilized, often obtaining consistent biometric information can be difficult. In particular, weight loss, or gain, changing of appearance, or the like can result in inconsistent result for sensors and devices that obtain biometric information preventing access to the electronic device. Consequently, the user continues to feel annoyed and frustrated when attempting to access their electronic device.

SUMMARY

In accordance with embodiments herein, an electronic device is provided that has an input device including an input sensor configured to detect synaptic signals from a user. An electronic device sensor is also provided that detects environmental signals or user signals. The electronic device also includes a memory to store executable instructions, and one or more processors. When implementing the executable instructions, the one or more processors determine an environmental characteristic based on the environmental signals or a user characteristic based on the user signals, and determine when to grant access to the electronic device based on the synaptic signals based on the environmental characteristic or the user characteristic.

Optionally, the one or more processors are configured to prevent access to the electronic device using the synaptic signals based on the environmental characteristic or the user characteristic. In one aspect, the one or more processors are configured to provide an alternative access method to a user to access the electronic device in response to preventing access to the electronic device using the synaptic signals. In another aspect, the alternative access method includes one of receiving a fingerprint, identifying a user via facial recognition, identifying a user via voice recognition, or using a password. In one example, the one or more processors are configured to grant access to the electronic device based on the synaptic signals detected. In another example, to grant access to the electronic device based on the synaptic signals detected the one or more processors are configured to obtain a baseline synaptic response by providing a stimuli to the user and recording the synaptic signals detected after providing the stimuli, obtain an access synaptic response by providing the stimuli to the user at a time after obtaining the baseline synaptic response, and compare the baseline synaptic response to the access synaptic response. Optionally, the user characteristic is a biometric characteristic. In one aspect, the environmental characteristic is a threshold noise level. In another aspect, the electronic device sensor is at least one of a camera, a microphone, or a heart monitor. In one example, the input device is a headset configured to matingly engage a head of the user such that the input sensor engages the head of the user.

In accordance with embodiments herein, a method is provided for accessing an electronic device where under control of one or more processors including program instructions to obtain a baseline synaptic response by providing a stimuli to a user. The method also includes to determine a user characteristic or an environmental characteristic in response actuation of an electronic device, and determine whether to use an access synaptic response to access the electronic device based on the user characteristic or the environmental characteristic.

Optionally, to obtain the baseline synaptic response includes providing information related to user characteristics or environmental characteristic that vary the baseline synaptic response in a prompt before obtaining the baseline synaptic response. The method can also include to determine a stressor based on the user characteristic or the environmental characteristic, and prevent use of the access synaptic response in response to determining the stressor. In one example, the method can include to provide an alternative access method in response to preventing use of the access synaptic response. In another example, the method can include to determine a stressor is not presented based on the user characteristic or the environmental characteristic, obtain the access synaptic response, compare the access synaptic response to the baseline synaptic response, and provide access to the electronic device based on the comparison between the access synaptic response and the baseline synaptic response.

In accordance with embodiments herein a computer program product comprising a non-signal computer readable storage medium is provided that includes computer executable code to automatically obtain a baseline synaptic response by providing a stimuli to a user. The computer executable code also to determine a user characteristic or an environmental characteristic in response actuation of an electronic device, and determine whether to use an access synaptic response to access the electronic device based on the user characteristic or the environmental characteristic.

Optionally, to obtain the baseline synaptic response includes providing information related to user characteristics or environmental characteristic that vary the baseline synaptic response in a prompt before obtaining the baseline synaptic response. In one aspect, the computer executable code to automatically determine a stressor based on the user characteristic or the environmental characteristic, and prevent use of the access synaptic response in response to determining the stressor. In another aspect, the computer executable code to automatically provide an alternative access method in response to preventing use of the access synaptic response. In one example, the computer executable code to automatically determine a stressor is not presented based on the user characteristic or the environmental characteristic, obtain the access synaptic response, compare the access synaptic response to the baseline synaptic response, and provide access to the electronic device based on the comparison between the access synaptic response and the baseline synaptic response.

DETAILED DESCRIPTION

Figure 1:
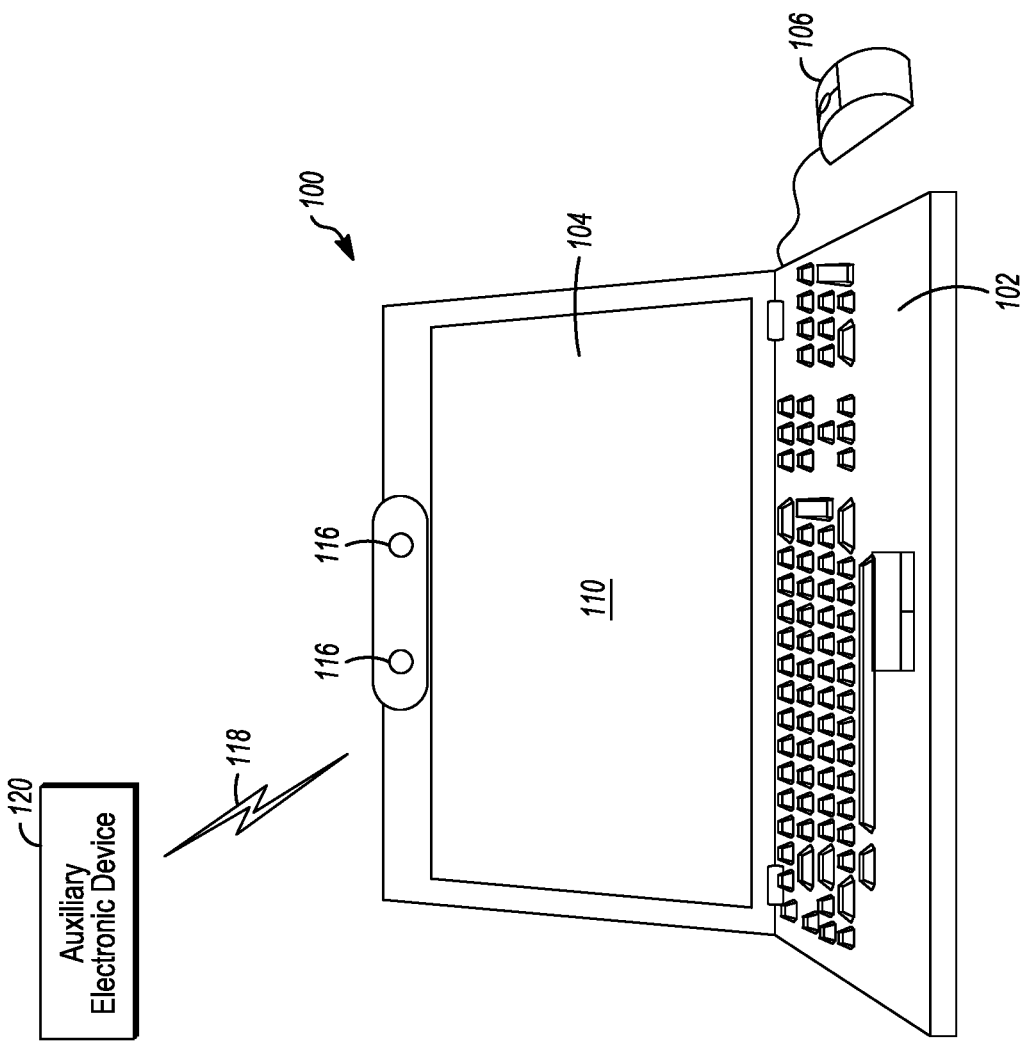
FIG. 1 illustrates a schematic view of an electronic device in an environment, in accordance with the embodiments herein.
Figure 1:
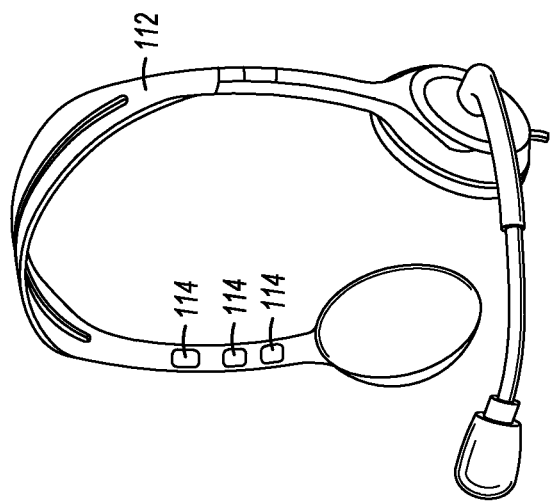

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "signal" as used herein refers to an electrical impulse or wave that is obtained from a sensor. Example signals include synaptic signals, user signals, environmental signals, or the like. Each signal may be obtained from an electronic device sensor where such sensor may include a camera, synaptic receptor, microphone, haptic feedback device, or the like. In some examples, a signal may be a user signal and also an environmental signal. In particular, a user signal refers to a signal generated by an electronic device sensor that is related to a user of an electronic device. An environmental signal refers to a signal generated by an electronic device sensor that is related to the environment of the electronic device. Meanwhile a synaptic signal references to a signal obtained by an input device sensor that is generated by a brain of a user.

The term "environment" refers to a physical region in which one or more electronic devices are located and in which an image on a screen of the electronic device is perceived (e.g., seen) by individuals. By way of example, an environment may refer to one or more rooms within a home, office or other structure. An environment may or may not have physical boundaries. For example, an environment instead be defined based upon a range over which individuals may perceive images provided by an electronic device. When an electronic device is portable and/or handheld, an environment associated with the electronic device may shift over time when the electronic device is moved. For example, an environment surrounding a smart phone, tablet device or laptop computer moves with the smartphone, tablet device or laptop computer. An environment surrounding an electronic device will shift each time the electronic device is relocated, such as when moved between different rooms of a home, office building or other residential or commercial structure.

The phrase "user characteristic" and "user characteristics" shall mean any and all features, qualities, etc. of a user of an electronic device. User characteristics may be obtained by being inputted into an electronic device, communicated by another electronic device, detected by an electronic device sensor, determined by a processor, or the like. Example user characteristics may include user identification, user facial features, biometric data and information related to the user, user location, user distance from the screen, personal information input into an electronic device by a user or other, fingerprint, retinal data or information, voice qualities including pitch, tone, accent, volume, etc., login information, user passwords, or the like.

The phrase "environmental characteristic" and "environmental characteristics" shall mean any and all features, qualities, etc. of an environment of an electronic device. Environmental characteristics can be obtained by being inputted into an electronic device, communicated by another electronic device, detected by an electronic device sensor, determined by a processor, or the like. Example environmental characteristics include temperatures, noise levels, light levels, landmarks, geolocations, latitude and longitude, other individuals or electronic devices in an environment, or the like.

The phrase "synaptic response" as used herein refers to any electronic signal, brain signal, interaction between cells in the brain or the like. In one example, the synaptic response can be the result of a stimuli provided to a user. A synaptic response is considered a baseline synaptic response when the synaptic response is taken to be compared to future synaptic responses. A synaptic response is considered an access synaptic response when the synaptic response is taken to obtain access to an electronic device by comparing the access synaptic response to the baseline synaptic response.

The term "access" as used herein refers being granted permission, being allowed to enter, being able to receive, etc. to an electronic device. For the avoidance of doubt, turning on or actuating an electronic device is not accessing the electronic device. Instead, to access the electronic device a step must be undertaken for permission, allowance, or the like. The step must be taken before programs, applications, documents, files, etc. can be observed by a user.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the base device and a secondary device, and/or iii) receiving the data, signals, information, etc. at a remote server over a network connection. The obtaining operation, when from the perspective of a base device, may include sensing new signals in real time, and/or accessing memory to read stored data, signals, information, etc. from memory within the base device. The obtaining operation, when from the perspective of a secondary device, includes receiving the data, signals, information, etc. at a transceiver of the secondary device where the data, signals, information, etc. are transmitted from a base device and/or a remote server. The obtaining operation may be from the perspective of a remote server, such as when receiving the data, signals, information, etc. at a network interface from a local external device and/or directly from a base device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

A device and methods are provided for gaining access to an electronic device by utilizing the synaptic responses of a user to stimuli. The electronic device monitors both the user and environment to determine whether utilizing synaptic responses is a viable method for accessing the electronic device. If the electronic device determines that stressors are provided as a result of user characteristics, environmental characteristics, or the like, another method of accessing the electronic device may be provided.

Figure 2:
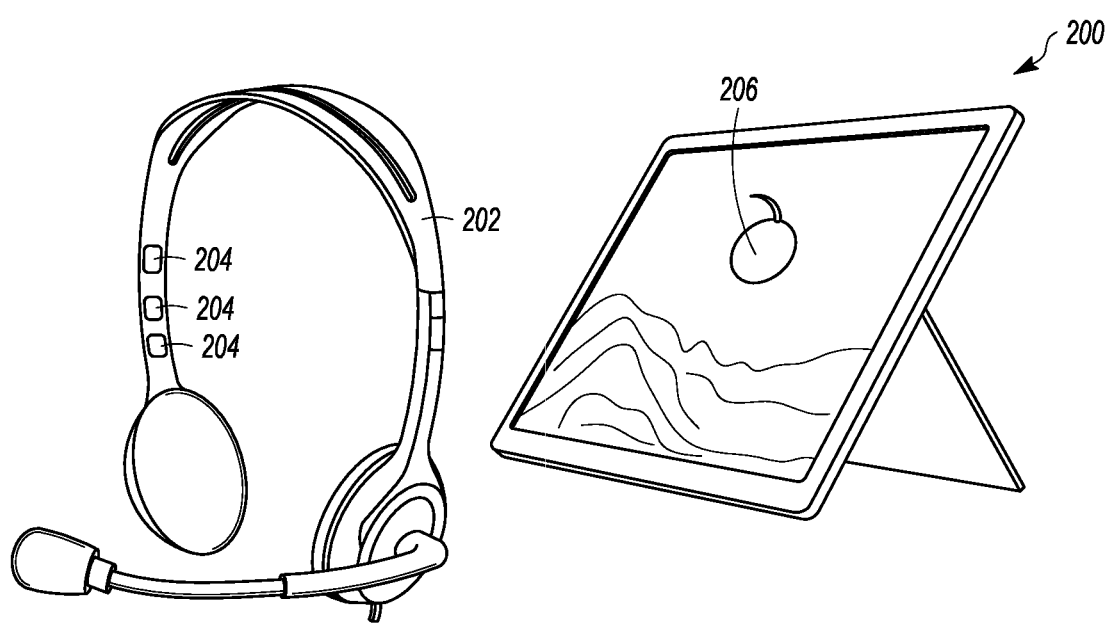
FIG. 2 illustrates a schematic view of an electronic device, in accordance with embodiments herein.

FIGS. 1 and 2 illustrate an example electronic device 100. While illustrated as a laptop, in other example embodiments the electronic device may be a smart phone, iPad, tablet, portable electronic device, or the like. The electronic device includes a keyboard 102 that is hingedly coupled to a display 104. An input device 106 such as a mouse is coupled either through a cord, such as a USB cord, or wirelessly. In other examples, the keyboard 102 may include a touch pad that functions as a mouse. The display 104 can include a screen 110 or display.

The electronic device 100 can also include at least one input device 112, that in one example may be a headset that is configured to matingly engage the head of a user. In one example the input device may include one or more input sensors 114 configured to obtain biometric data or feedback related to the user. For example, when the input device 112 is a headset, the input sensors 114 can be input sensors of an input device such as a headset. In one example the input sensors 114 obtain data and information based on synaptic responses of the user. Synaptic responses occur with electrical energy is generated between cell in the brain as a result of responding to a stimulus. These electrical fluctuations and changes can be obtained, or detected by the input sensors 114. A known stimuli can be provided to the user that results in a unique synaptic response detected by the input sensors 114. The known stimuli can be a question, illustration, statement, short video, or the like that results in a synaptic response of the user. In this manner, a synaptic response to the known stimuli can be obtained and recorded utilizing a security application of the electronic device, and then the same known stimuli can be provided to the user when accessing the electronic device at a later time. When the same synaptic response occurs that is unique to the user, access to the electronic device is obtained.

The electronic device may also include one or more electronic device sensors 116 and a communication link 118 to an auxiliary electronic device 120. The electronic device sensor 116 and auxiliary electronic device 120 may each be configured to obtain user characteristics and/or environmental characteristics, where the auxiliary electronic device 120 may communicate the obtained user characteristics and/or environmental characteristics.

The one or more electronic device sensors 116 may include a camera, microphone, audio device, haptic device, or the like, while the auxiliary electronic device 120 may be a Fitbit, heart monitor, wearable electronic device, smart watch, or the like. The one or more electronic device sensors 116 and auxiliary electronic device 120 may each be configured to obtain visual data, audio data, movement data, vibration data, biometric data, or the like associated with the user and environment of the electronic device.

User characteristics may include the identity of the user, voice characteristics such as tone, volume, frequency, accents, pitch, or the like, visual characteristics such as facial features, eye color, skin tone or color, facial hair, or the like, biometric characteristics such as pulse, body temperature, respiration rate, blood pressure, etc., or the like. In particular, the user characteristics may be utilized by one or more processors of the electronic device to determine biometric information related to a user, and recent activities or actions of the user. Such recent activities or actions of the user may result in obtaining certain biometric information or measurements usable to utilize as a comparison against a control biometric measure to be difficult. As such, a security application may include instructions not to utilize certain biometric data, information, or measurements at a given time for security purposes to access the electronic device.

As an example, a stimuli utilized to obtain a previously determined synaptic response may be images of food. However, this synaptic response may be altered as a result of a user having an illness, such as a stomach flu, or as a result of being hungry. Consequently, in an embodiment when the electronic device 100 is a smart watch, Fit Bit, etc. that includes an electronic device sensor 116 that can determine the user characteristic of a body temperature of the user, and the temperature is high indicating an illness is present, different biometric data other than a synaptic response or feedback may be utilized for accessing the electronic device. In this manner, instead of synaptic feedback, a security application may utilize facial recognition, fingerprint identification, or even prompt for a password. In another embodiment, a security application may access another application such as a calendar, utilize a clock, or the like to determine the user has not recently eaten. Because being hungry may vary a synaptic response, instead of using a synaptic response to gain access to the electronic device, other biometric data, or another methodology may be utilized. In another example, stress levels, negative human interactions, or the like may also alter synaptic responses to stimuli. Thus, a detection by the electronic device sensor 116 or an auxiliary electronic device 120 of an increased heart rate, increased blood pressure, loud sounds or voices received by a microphone, or the like, can result in a determination made to no utilize synaptic responses to stimuli to permit access to the electronic device 100.

In addition to user characteristics, environmental characteristics obtained using an electronic device sensor 116 or auxiliary electronic device 120 may also be utilized to determine a method of accessing the electronic device 100. For example, when an individual is in a noisy or busy environment, their lack of concentration may alter synaptic responses to stimuli. Therefore, if an electronic device sensor 116 detects a determined threshold noise level, such as a threshold of background noise, a determination may be made to not use synaptic responses to stimuli to permit access to the electronic device. In yet another example, environmental characteristics may include going from an outdoor environment to going to an indoor environment. An individual may be shoveling snow off their driveway, and then come inside and decide to use the electronic device. In such an instance, an auxiliary electronic device 120 such as a smart watch may include a temperature sensor that detects the change in temperature, and a heart monitor that detects an increase in the heart rate of a user in combination with a change in temperature. Once the individual comes inside and opens an electronic device 100, such as a laptop computer with an accompanying headset, the electronic device 100 may communicate with the auxiliary electronic device 120 to determine in the last five minutes the temperature of the smart watch has decreased while the heart rate of the user has been elevated. Under such conditions, using a synaptic response to stimuli may not be ideal, and the electronic device 100 may determine to use another manner for accessing the electronic device be provided.

FIG. 2 illustrates an electronic device 200 used in combination with a headset 202 worn by a user when accessing the electronic device. In particular, the headset 202 may matingly engage the head of the user. The electronic device may be computing device, laptop computer, smartphone, smart watch, or the like. In one example, the electronic device 200 is the electronic device of FIG. 1. The headset 202 may be earphones, a strap, or the like that may be worn by a user of the electronic device 200. The headset 202 can be in communication with the electronic device via a wire connection such as a USB cord, ethernet cord, or the like, or may be wirelessly connected via a Wi-Fi network, cellular network, or the like.

The headset 202 can include plural headset sensors 204 configured to engage, or be provided in close proximity to the head of the user. Each sensor may be configured to obtain user signals, that in one example can include synaptic response signals. The user signals may also be related to or associated with electrical signals of the brain, pulse signals, or the like that may be utilized to determine a unique synaptic response to stimuli 206. In one example, the plural headset sensors 204 may include one or more sensors that obtain user signals related to user characteristics or environmental signals related to environmental characteristics. Alternatively, the headset 202 in one example may be an auxiliary electronic device that communicates with the electronic device 200 to provide user characteristics and/or environmental characteristics so a determination may be made whether to use synaptic responses to stimuli as a method for accessing an electronic device 200.

As illustrated, the stimuli in one example may include pictures of food, individuals, events, colors, strobing, or the like that results in a unique synaptic response. In this manner, at a time when the user is not undergoing any stress from illness, exercise, temperature changes, arguments, mood changes, etc., the synaptic responses to each stimuli may be recorded and saved in a storage device of the electronic device 200. In one example, a security application may be utilized by the electronic device that includes instructions related to storing the synaptic response for each stimuli. In one example, the security application may include instructions to prompt the user to answer questions related to their current mood or conditions and an explanation that the synaptic response being obtained are baseline synaptic responses and should only be obtained if no external stressors are presented. To this end, the different stimuli may be presented multiple times to ensure a variation in synaptic responses is not detected when a baseline synaptic response is provided.

Figure 3:
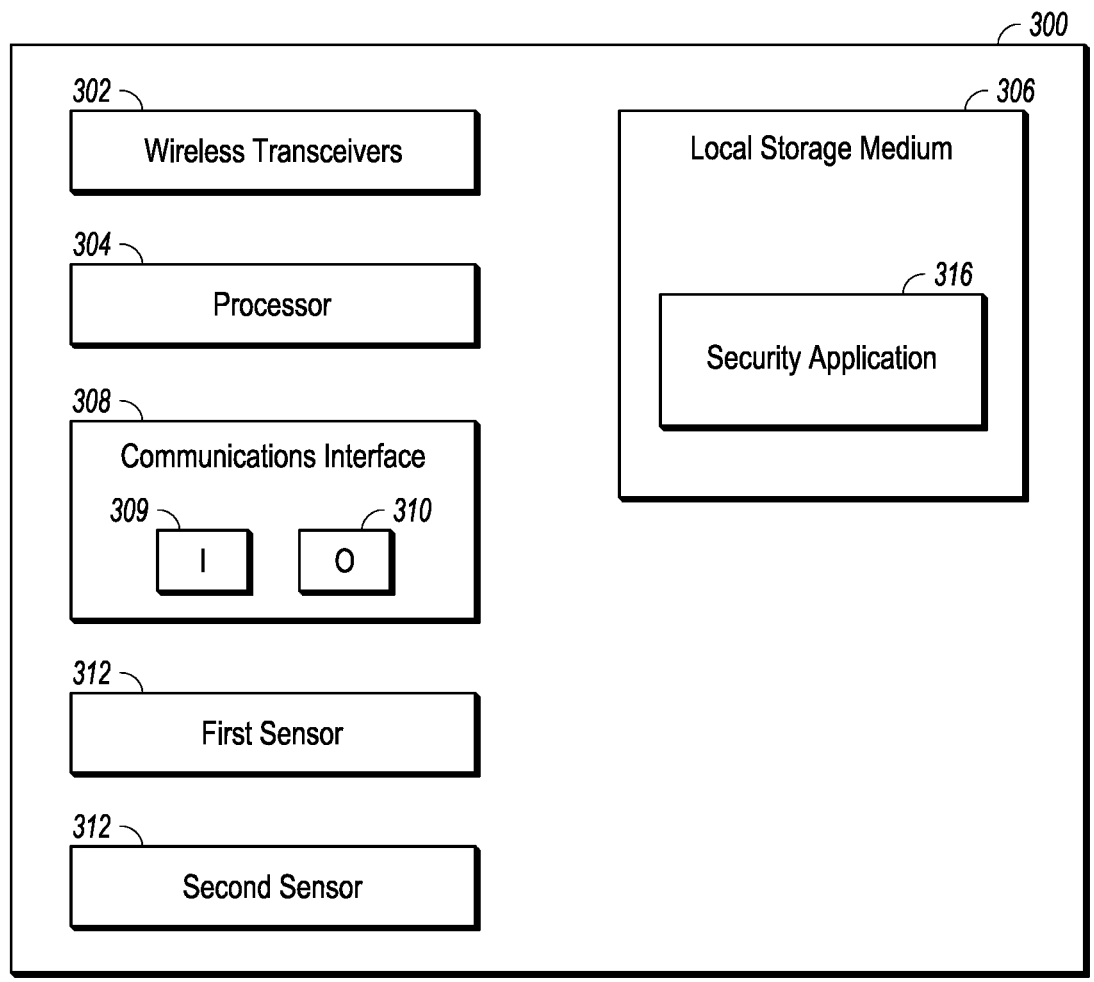
FIG. 3 illustrates a schematic view of an electronic device, in accordance with embodiments herein.

FIG. 3 illustrates a simplified block diagram of an electronic device 300 configured to provide a security for accessing data and information on the electronic device by using access synaptic responses of a user to stimuli. In one example, the electronic device 300 is the electronic device of FIGS. 1-2. The electronic device 300 includes components such as one or more transceivers 302, one or more processors 304 (e.g., a microprocessor, microcomputer, application-specific integrated circuit, etc.), and one or more local storage medium (also referred to as a memory portion) 306.

Each transceiver 302 can utilize a known wireless technology for communication. The one or more processors 304 format outgoing information and convey the outgoing information to one or more of the wireless transceivers 302 for modulation to communication signals. The transceiver(s) 302 convey the modulated signals to a remote device, such as a cell tower or a remote server (not shown). Each transceiver may communicate with a headset, auxiliary electronic device, or the like to obtain signals, including user signals and environmental signals, data, information, etc. related to user characteristics, environmental characteristics, etc.

The local storage medium 306 can encompass one or more memory devices of any of a variety of forms (e.g., read only memory, random access memory, static random access memory, dynamic random access memory, etc.) and can be used by the one or more processors 304 to store and retrieve data. The data that is stored by the local storage medium 306 can include, but need not be limited to, operating systems, applications, obtained data, informational data, user characteristics data, environmental characteristics data, etc. Each operating system includes executable code that controls basic functions of the device, such as interaction among the various components, communication with external devices via the transceivers 302, and storage and retrieval of applications, user characteristic data, and environmental data to and from the local storage medium 306.

The electronic device 300 in one embodiment also includes a communications interface 308 that is configured to communicate with a network resource. The communications interface 308 can include one or more input devices 309 and one or more output devices 310. The input and output devices 309, 310 may each include a variety of visual, audio, and/or mechanical devices. For example, the input devices 309 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. In another example, the input device may be a headset, or other device that engages a head of a user and can obtain or detect synaptic responses from a user, including access synaptic responses based on stimuli. Meanwhile, the output devices 310 can include a visual output device such as a liquid crystal display screen, one or more status indicators that may be light elements such as light emitting diodes, an audio output device such as a speaker, alarm and/or buzzer, and a mechanical output device such as a vibrating mechanism. The screen may be touch sensitive to various types of touch and gestures. As further examples, the output device(s) 310 may include a non-touch sensitive screen, a text-only screen, a smart phone screen, an audio output (e.g., a speaker or headphone jack), and/or any combination thereof.

The electronic device 300 may also include one or more electronic device sensors 312 that can obtain user characteristics data and environmental characteristics data. The one or more electronic device sensors may include a microphone, camera, thermometer, heart monitor, infrared, haptic sensor, or the like that may obtain data related to one of or both user characteristics and/or environmental characteristics. The electronic device sensors 312 may be part of the electronic device 300, on an auxiliary electronic device in communication with the electronic device 300 such as a headset, or the like.

The electronic device 300 may also include a security application 316. In one example, the security application 316 includes instructions to access information and data of the electronic device. The security application 316 may provide numerous methods or processes for providing access to information and data of the electronic device. The numerous methods and processes may include providing a login, password, username, or the like. In another example, the method may include obtaining biometric information related to the user including fingerprint data, facial recognition data, eye scanning data, voice recognition, or the like. In one example, the security application 316 includes a process for accessing the electronic device 300 utilizing access synaptic responses to stimuli. In particular, the security application 316 can include instructions for obtaining access synaptic responses. The instructions may include having a user provide baseline synaptic responses. The instructions my provide prompts and utilize user characteristics and environmental characteristics to ensure that the user is not under any external stressors that could result in incorrect baseline measurements. Once a determination is made that baseline measurement may be obtained, different stimuli are presented to the user. The stimuli may be a picture of a family member, a piece of artwork, a picture of a favorite meal, a picture of famous person, a quote, a piece of music, or the like that results in a synaptic response by the user. In one example, the same stimuli may be provided a determined period, such as five or ten minutes apart to verify no changes in the baseline synaptic response is provided as a result an unknown stressor. Once the security application 316 has the baseline synaptic responses, then at a later time, such as several days later, to access data and information on the electronic device the same stimuli is shown to the user to obtain an access synaptic response. If the access synaptic response matches the baseline synaptic response, then access to the information and data on the electronic device is granted.

In addition, the security application 316 also includes instructions for determining when an access synaptic response should not be utilized as a method or process for gaining access to the electronic device 300. The instructions include obtaining data or information such as user characteristic data or environmental characteristic data that can be utilized to make determinations whether a user is experiencing a stressor that would result in an inaccurate access synaptic response to a stimulus. To this end, when an individual desires to gain access to an electronic device, the security application 316 may include instructions to obtain sensor data or information, input device data or information, auxiliary electronic device data or information, etc. from a determined period of time, such as the previous ten minutes before an attempt is made to gain access to the electronic device 300. From this data or information, including user characteristic data and environmental characteristic data determinations may be made that a user is experiencing a stressor that may vary an access synaptic response to a stimulus.

For example, a heart rate of an individual may be monitored such that is the heart rate of the individual varies more than a threshold value during the determined period of time, a stressor is provided. In particular, an argument with a family member or friend, exercise, sudden scare, or the like can all cause fluctuations in heart rate and can also result in changes in access synaptic responses to stimuli. In another example, a temperature change in an environment may indicate someone is coming in from either a hot environment or cold environment that can cause changes in access synaptic responses. In yet another example the amount of average noise recorded during the determined period of time being above a determined threshold noise level can indicate the user is in a noisy environment adding distractions that could result in access synaptic responses to stimuli to vary. In another example, a respiration rate may be monitored by an auxiliary electronic device that is communicated to the security application 316 where a threshold respiration rate results in a determination that a stressor is in the environment that could result in inaccurate access synaptic responses to stimuli.

In each instance the security application 316 makes a determination whether a stressor is being experienced by the user that could result in a change in an access synaptic response to a stimuli. The determination may be made utilizing a lookup table, decision tree, threshold, calculation, an algorithm, an artificial intelligence algorithm, a machine learning algorithm, a mathematical function, a mathematical model, or the like. Once the determination is made that a stressor exists, the security application 316 may include instructions to provide a different method for accessing information and data of the electronic device. In one example, the security application 316 may include settings where the use selects a second method for making a determination. Alternatively, the second method may be determined by a manufacturer. The second method may include a login, password, username, fingerprint identification, facial recognition identification, voice recognition identification, or the like. In this manner, even when an individual is experiencing a stressor, they may still gain access to an electronic device. In one example, the security application may provide a prompt informing the user a potential stressor has been detected and another method of gaining access is required. In such an embodiment, the security application may even allow the user to select the method or process of gaining access to the electronic device.

Figure 4:
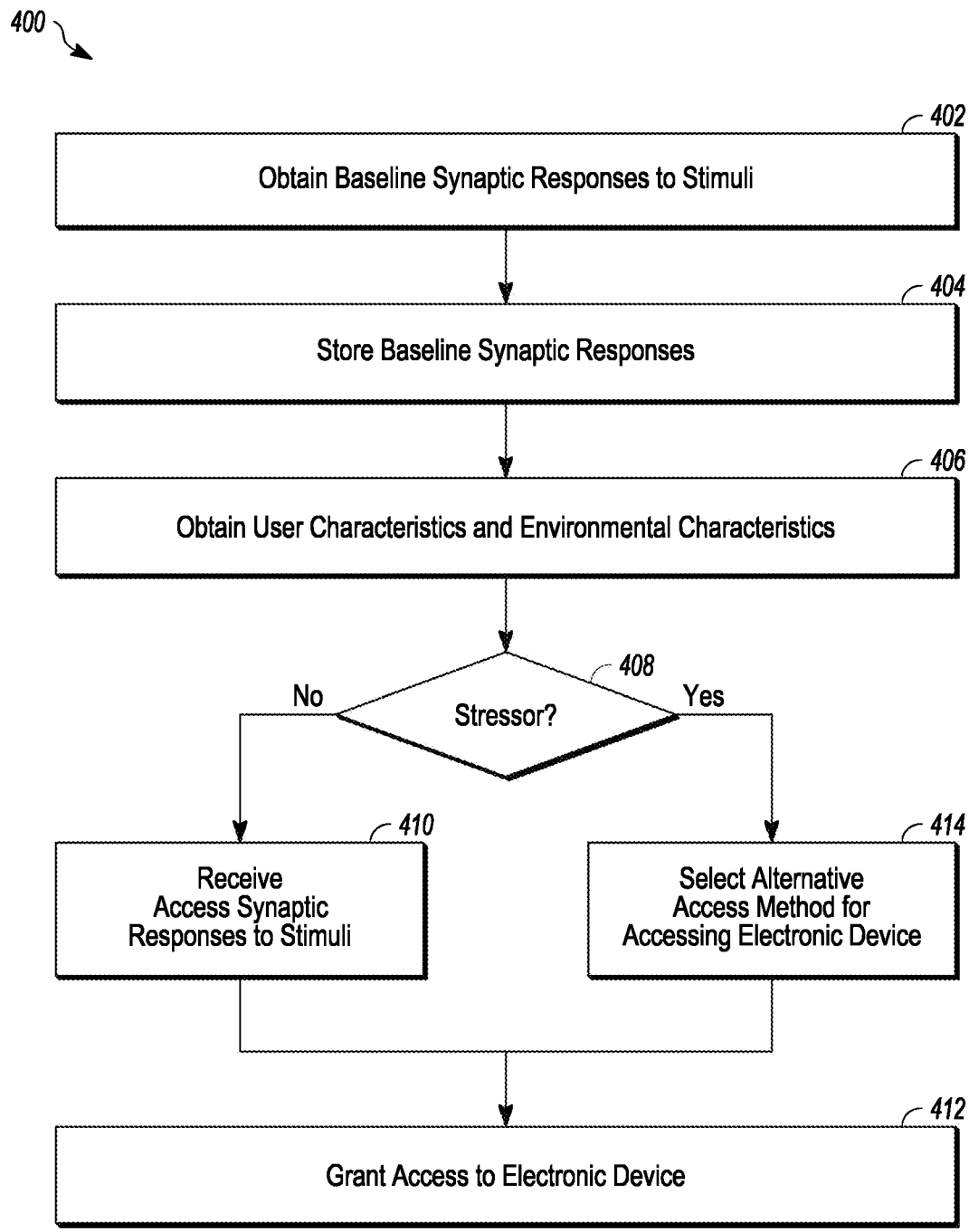
FIG. 4 illustrates a schematic block flow diagram of a method of accessing an electronic device, in accordance with embodiments herein.

FIG. 4 illustrates a flow block diagram of a process 400 for gaining access to data and information in an electronic device. In one example, the electronic device is the electronic device as described in relation to FIGS. 1-3. In another example, the electronic device performs the process based on instructions that may be stored in the memory or storage device of the electronic device.

At 402, one or more processors obtain baseline synaptic responses to stimuli. In one example, when a security application is originally installed, a prompt is presented on an output screen that stimuli is to be presented to the user to obtain baseline synaptic responses. The prompt can instruct the user that the user needs to be in a stress free state before the baseline synaptic responses are obtained. In another example, user characteristics and/or environmental characteristics may be obtained, and a determination may be made if a stressor is detected. If a stressor is determined to be present, the security application may provide a prompt that a stressor is detected that may cause inaccurate results and that the user must come back at a later time. Once the user indicates no stressors are present, and/or the one or more processors determine no stressor is present, stimuli are presented to the user and baseline synaptic responses are obtained. In one example an input device such as a headset that includes input sensors such as synaptic sensors obtain the baseline synaptic responses.

At 404, the one or more processors store the baseline synaptic responses in a storage device. For each stimuli provided, the different baseline synaptic responses associated with each stimuli are each saved in a storage device or memory of the electronic device for later use.

At 406, the one or more processors obtain user characteristics and environmental characteristics for a determined time period in response to a user wanting to gain access to an electronic device. After the baseline synaptic responses are stored in a storage device, at a later time, a user may desire to gain access to the electronic device using the stored baseline synaptic responses. Before comparing access synaptic responses to the stored baseline synaptic responses, the one or more processors obtain user signals and/or environmental signals from an electronic device sensor, an auxiliary electronic device, or the like to ensure no stressors exist that may cause inaccuracies in the access synaptic response comparison to the baseline synaptic response. The electronic device sensor may obtain data and information that can be auditory, visual, haptic, infrared, etc.

Based on the user signals, the user characteristics can be determined. User characteristics pertain to or are related to the user and may include heart rate, user temperature, blood pressure, respiration rate, or the like. Based on the environmental signals, the environmental characteristics can be determined. Environmental characteristics pertain to or are related to the environment and may include noise levels, environmental temperature, movement data or information, or the like. The user may attempt to gain access to the electronic device by actuating a key, button, mouse, etc. to indicate to the electronic device the user desires to gain access to the electronic device. In one example, the determined period of time may be the previous ten minutes, twenty minutes, thirty minutes, sixty minutes, etc. before the user actuates the key, button mouse, etc. Such information may be stored in a storage device of the electronic device and retrieved by the one or more processors via utilization of a security application.

At 408, the one or more processors determine whether a stressor is presented that may cause a access synaptic response to stimuli to not be accurate based on the user characteristics and environmental characteristics obtained. In one example, security application may include a lookup table that includes thresholds for heartrate, heartrate fluctuations, user temperature, environmental temperature, environmental temperature fluctuations, noise thresholds, noise variance, noise fluctuations, or the like, or includes functions, models, etc. related to the same to make the determination.

If at 408 the one or more processors determine a stressor is not presented, then at 410, the one or more processors present stimuli to the user and receive access synaptic responses to the stimuli. With no stressors of the user or in the environment identified, the one or more processors move forward with presenting stimuli and receiving access synaptic responses that may be compared to the baseline synaptic responses such that a match, or similar response results in access to data and information of the electronic device to be accessible. The one or more processors can then determine if an access synaptic response matches a baseline synaptic response. If the comparison results in a match between the access synaptic response(s) obtained and the baseline synaptic response(s), then at 412 the one or more processors grant access to information and data on the electronic device. However, if an access synaptic response obtained does not match the baseline synaptic response, then access to the data and information of the electronic device is denied.

If at 408 the one or more processors determine a stressor is presented, then at 414, the one or more processors select an alternative access method for accessing the electronic device. Thus, if a stressor is determined to be present, then access synaptic responses are not utilized as the security process for accessing the electronic device. Instead an alternative access method such as fingerprint identification, username and password, other biometric identification, or the like is utilized to access the electronic device. In one example, the use may provide in setting of a security application the alternative method. Otherwise, the security application may simply provide the default security method of the electronic device from before installation of the security application, the default security method of a manufacturer, or the like.

By using this methodology, security may be improved by utilizing an access synaptic response unique to the user. In addition, measures are provided to prevent annoyance of a user who cannot access an electronic device as a result of the access synaptic responses of the user changing.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface and a storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device, comprising:
an input device including an input sensor configured to detect synaptic signals from a user;
provide a stimuli to obtain the synaptic signals from the user;
an electronic device sensor configured to detect at least one of environmental signals or user signals;
memory to store executable instructions;
one or more processors, when implementing the executable instructions, to:
determine at least one of an environmental characteristic based on the environmental signals or a user characteristic based on the user signals;
determine when to grant access to the electronic device based on the synaptic signals based on at least one of the environmental characteristic or the user characteristic;
determine a stressor while providing the stimuli to obtain the synaptic signal based on the user characteristic or the environmental characteristic; and provide an alternative access method to the user to access the electronic device in response to determining the stressor.

2. The electronic device of claim 1, wherein the one or more processors are configured to:
prevent access to the electronic device using the synaptic signals based on the environmental characteristic or the user characteristic.

3. The electronic device of claim 1, wherein the alternative access method includes one of receiving a fingerprint, identifying a user via facial recognition, identifying a user via voice recognition, or using a password.

4. The electronic device of claim 1, the one or more processors are configured to:
grant access to the electronic device based on the synaptic signals detected.

5. The electronic device of claim 4, wherein to grant access to the electronic device based on the synaptic signals detected the one or more processors are configured to:
obtain a baseline synaptic response by providing the stimuli to the user and recording the synaptic signals detected after proving the stimuli;
obtain an access synaptic response by providing the stimuli to the user at a time after obtaining the baseline synaptic response; and
compare the baseline synaptic response to the access synaptic response.

6. The electronic device of claim 1, wherein the user characteristic is a biometric characteristic.

7. The electronic device of claim 1, wherein the environmental characteristic is a threshold noise level.

8. The electronic device of claim 1, wherein the electronic device sensor is at least one of a camera, a microphone, or a heart monitor.

9. The electronic device of claim 1, wherein the input device is a headset.

10. A method for accessing an electronic device, comprising:
under control of one or more processors including program instructions to:
obtain, from an input sensor, a baseline synaptic response by providing a stimuli to a user;
obtain, from an electronic device sensor, at least one of environmental signals or user signals;
determine at least one of a user characteristic or an environmental characteristic in response actuation of an electronic device based on the at least one of the environmental signals or the user signals;
determine whether to use an access synaptic response to access the electronic device based on the at least one of the user characteristic or the environmental characteristic;
determine a stressor while providing the stimuli to obtain the access synaptic response based on the user characteristic or the environmental characteristic; and
provide an alternative access method to the user to access the electronic device in response to determining the stressor.

11. The method of claim 10, wherein to obtain the baseline synaptic response includes providing information related to user characteristics or environmental characteristic that vary the baseline synaptic response in a prompt before obtaining the baseline synaptic response.

12. The method of claim 10, further including instructions to:
determine the stressor based on the user characteristic or the environmental characteristic; and
prevent use of the access synaptic response in response to determining the stressor.

13. The method of claim 10, further including instructions to:
determine the stressor is not presented based on the user characteristic or the environmental characteristic;
obtain the access synaptic response;
compare the access synaptic response to the baseline synaptic response; and
provide access to the electronic device based on the comparison between the access synaptic response and the baseline synaptic response.

14. A computer program product comprising a non-signal computer readable storage medium comprising computer executable code to automatically:
obtain, from an input sensor, a baseline synaptic response by providing a stimuli to a user;
obtain, from an electronic device sensor, at least one of environmental signals or user signals;
determine at least one of a user characteristic or an environmental characteristic in response actuation of an electronic device based on the at least one of the environmental signals or the user signals; and
determine whether to use an access synaptic response to access the electronic device based on the at least one of the user characteristic or the environmental characteristic;
determine a stressor while providing the stimuli to obtain the access synaptic response based on the user characteristic or the environmental characteristic; and
provide an alternative access method to the user to access the electronic device in response to determining the stressor.

15. The computer program product of claim 14, wherein to obtain the baseline synaptic response includes providing information related to the user characteristics or the environmental characteristic that vary the baseline synaptic response in a prompt before obtaining the baseline synaptic response.

16. The computer program product of claim 14, the computer executable code to automatically:
determine the stressor based on the user characteristic or the environmental characteristic; and
prevent use of the access synaptic response in response to determining the stressor.

17. The computer program product of claim 14, the computer executable code to automatically:
determine the stressor is not presented based on the user characteristic or the environmental characteristic;
obtain the access synaptic response;
compare the access synaptic response to the baseline synaptic response; and
provide access to the electronic device based on the comparison between the access synaptic response and the baseline synaptic response.

18. The electronic device of claim 5, wherein the one or more processors are configured to:
determine whether the stressor is present prior to obtaining the baseline synaptic response; and
only obtaining the baseline synaptic response if the stressor is not present.

19. The method of claim 10, further including instructions to:
determine whether the stressor is present prior to obtaining the baseline synaptic response; and
only obtain the baseline synaptic response if the stressor is not present.

20. The computer program product of claim 14, the computer executable code to automatically:
 determine whether the stressor is present prior to obtaining the baseline synaptic response; and
 only obtain the baseline synaptic response if the stressor is not present.

* * * * *